(12) United States Patent
Teng et al.

(10) Patent No.: US 10,691,104 B2
(45) Date of Patent: Jun. 23, 2020

(54) ADDITIVELY MANUFACTURING STRUCTURES FOR INCREASED SPRAY FORMING RESOLUTION OR INCREASED FATIGUE LIFE

(71) Applicant: DIVERGENT TECHNOLOGIES, INC., Los Angeles, CA (US)

(72) Inventors: Alexander Pai-chung Teng, Lomita, CA (US); Chor Yen Yap, Gardena, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/981,775

(22) Filed: May 16, 2018

(65) Prior Publication Data
US 2019/0354083 A1    Nov. 21, 2019

(51) Int. Cl.
G05B 19/4099        (2006.01)

(52) U.S. Cl.
CPC ............. *G05B 19/4099* (2013.01); *G05B 2219/49023* (2013.01)

(58) Field of Classification Search
CPC ............ G05B 19/4099; G06F 2217/06; G06F 2217/16
USPC ....................................................... 700/118
See application file for complete search history.

(56) References Cited

U.S. PATENT DOCUMENTS

| | | | |
|---|---|---|---|
| 5,203,226 A | 4/1993 | Hongou et al. | |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |

(Continued)

FOREIGN PATENT DOCUMENTS

| WO | 1996036455 A1 | 11/1996 |
|---|---|---|
| WO | 1996036525 A1 | 11/1996 |

(Continued)

OTHER PUBLICATIONS

US 9,202,136 B2, 12/2015, Schmidt et al. (withdrawn)
US 9,809,265 B2, 11/2017, Kinjo (withdrawn)
US 10,449,880 B2, 10/2019, Mizobata et al. (withdrawn)

*Primary Examiner* — Michael J Brown
(74) *Attorney, Agent, or Firm* — Arent Fox LLP

(57) ABSTRACT

Systems, apparatus, and method for forming a structure are disclosed. An apparatus for forming a structure may be configured to receive instructions for printing at least one portion of the structure. The instructions may be based on a data model of the structure. The apparatus for forming a structure may be configured to receive material and print the at least one portion of the structure based on the instructions. The printing may include spray forming the material to produce the at least one portion of the structure.

20 Claims, 11 Drawing Sheets

(56) References Cited

U.S. PATENT DOCUMENTS

| | | |
|---|---|---|
| 6,644,721 B1 | 11/2003 | Miskech et al. |
| 6,811,744 B2 | 11/2004 | Keicher et al. |
| 6,866,497 B2 | 3/2005 | Saiki |
| 6,919,035 B1 | 7/2005 | Clough |
| 6,926,970 B2 | 8/2005 | James et al. |
| 7,152,292 B2 | 12/2006 | Hohmann et al. |
| 7,344,186 B1 | 3/2008 | Hausler et al. |
| 7,500,373 B2 | 3/2009 | Quell |
| 7,586,062 B2 | 9/2009 | Heberer |
| 7,637,134 B2 | 12/2009 | Burzlaff et al. |
| 7,710,347 B2 | 5/2010 | Gentilman et al. |
| 7,716,802 B2 | 5/2010 | Stern et al. |
| 7,745,293 B2 | 6/2010 | Yamazaki et al. |
| 7,766,123 B2 | 8/2010 | Sakurai et al. |
| 7,852,388 B2 | 12/2010 | Shimizu et al. |
| 7,908,922 B2 | 3/2011 | Zarabadi et al. |
| 7,951,324 B2 | 5/2011 | Naruse et al. |
| 8,094,036 B2 | 1/2012 | Heberer |
| 8,163,077 B2 | 4/2012 | Eron et al. |
| 8,286,236 B2 | 10/2012 | Jung et al. |
| 8,289,352 B2 | 10/2012 | Vartanian et al. |
| 8,297,096 B2 | 10/2012 | Mizumura et al. |
| 8,354,170 B1 | 1/2013 | Henry et al. |
| 8,383,028 B2 | 2/2013 | Lyons |
| 8,408,036 B2 | 4/2013 | Reith et al. |
| 8,429,754 B2 | 4/2013 | Jung et al. |
| 8,437,513 B1 | 5/2013 | Derakhshani et al. |
| 8,444,903 B2 | 5/2013 | Lyons et al. |
| 8,452,073 B2 | 5/2013 | Taminger et al. |
| 8,599,301 B2 | 12/2013 | Dowski, Jr. et al. |
| 8,606,540 B2 | 12/2013 | Haisty et al. |
| 8,610,761 B2 | 12/2013 | Haisty et al. |
| 8,631,996 B2 | 1/2014 | Quell et al. |
| 8,675,925 B2 | 3/2014 | Derakhshani et al. |
| 8,678,060 B2 | 3/2014 | Dietz et al. |
| 8,686,314 B2 | 4/2014 | Schneegans et al. |
| 8,686,997 B2 | 4/2014 | Radet et al. |
| 8,694,284 B2 | 4/2014 | Berard |
| 8,720,876 B2 | 5/2014 | Reith et al. |
| 8,752,166 B2 | 6/2014 | Jung et al. |
| 8,755,923 B2 | 6/2014 | Farahani et al. |
| 8,787,628 B1 | 7/2014 | Derakhshani et al. |
| 8,818,771 B2 | 8/2014 | Gielis et al. |
| 8,873,238 B2 | 10/2014 | Wilkins |
| 8,978,535 B2 | 3/2015 | Ortiz et al. |
| 9,006,605 B2 | 4/2015 | Schneegans et al. |
| 9,071,436 B2 | 6/2015 | Jung et al. |
| 9,101,979 B2 | 8/2015 | Hofmann et al. |
| 9,104,921 B2 | 8/2015 | Derakhshani et al. |
| 9,126,365 B1 | 9/2015 | Mark et al. |
| 9,128,476 B2 | 9/2015 | Jung et al. |
| 9,138,924 B2 | 9/2015 | Yen |
| 9,149,988 B2 | 10/2015 | Mark et al. |
| 9,156,205 B2 | 10/2015 | Mark et al. |
| 9,186,848 B2 | 11/2015 | Mark et al. |
| 9,244,986 B2 | 1/2016 | Karmarkar |
| 9,248,611 B2 | 2/2016 | Divine et al. |
| 9,254,535 B2 | 2/2016 | Buller et al. |
| 9,266,566 B2 | 2/2016 | Kim |
| 9,269,022 B2 | 2/2016 | Rhoads et al. |
| 9,327,452 B2 | 5/2016 | Mark et al. |
| 9,329,020 B1 | 5/2016 | Napoletano |
| 9,332,251 B2 | 5/2016 | Haisty et al. |
| 9,346,127 B2 | 5/2016 | Buller et al. |
| 9,389,315 B2 | 7/2016 | Bruder et al. |
| 9,399,256 B2 | 7/2016 | Buller et al. |
| 9,403,235 B2 | 8/2016 | Buller et al. |
| 9,418,193 B2 | 8/2016 | Dowski, Jr. et al. |
| 9,457,514 B2 | 10/2016 | Schwärzler |
| 9,469,057 B2 | 10/2016 | Johnson et al. |
| 9,478,063 B2 | 10/2016 | Rhoads et al. |
| 9,481,402 B1 | 11/2016 | Muto et al. |
| 9,486,878 B2 | 11/2016 | Buller et al. |
| 9,486,960 B2 | 11/2016 | Paschkewitz et al. |
| 9,502,993 B2 | 11/2016 | Deng |
| 9,525,262 B2 | 12/2016 | Stuart et al. |
| 9,533,526 B1 | 1/2017 | Nevins |
| 9,555,315 B2 | 1/2017 | Aders |
| 9,555,580 B1 | 1/2017 | Dykstra et al. |
| 9,557,856 B2 | 1/2017 | Send et al. |
| 9,566,742 B2 | 2/2017 | Keating et al. |
| 9,566,758 B2 | 2/2017 | Cheung et al. |
| 9,573,193 B2 | 2/2017 | Buller et al. |
| 9,573,225 B2 | 2/2017 | Buller et al. |
| 9,586,290 B2 | 3/2017 | Buller et al. |
| 9,595,795 B2 | 3/2017 | Lane et al. |
| 9,597,843 B2 | 3/2017 | Stauffer et al. |
| 9,600,929 B1 | 3/2017 | Young et al. |
| 9,609,755 B2 | 3/2017 | Coull et al. |
| 9,610,737 B2 | 4/2017 | Johnson et al. |
| 9,611,667 B2 | 4/2017 | GangaRao et al. |
| 9,616,623 B2 | 4/2017 | Johnson et al. |
| 9,626,487 B2 | 4/2017 | Jung et al. |
| 9,626,489 B2 | 4/2017 | Nilsson |
| 9,643,361 B2 | 5/2017 | Liu |
| 9,662,840 B1 | 5/2017 | Buller et al. |
| 9,665,182 B2 | 5/2017 | Send et al. |
| 9,672,389 B1 | 6/2017 | Mosterman et al. |
| 9,672,550 B2 | 6/2017 | Apsley et al. |
| 9,676,145 B2 | 6/2017 | Buller et al. |
| 9,684,919 B2 | 6/2017 | Apsley et al. |
| 9,688,032 B2 | 6/2017 | Kia et al. |
| 9,690,286 B2 | 6/2017 | Hovsepian et al. |
| 9,700,966 B2 | 7/2017 | Kraft et al. |
| 9,703,896 B2 | 7/2017 | Zhang et al. |
| 9,713,903 B2 | 7/2017 | Paschkewitz et al. |
| 9,718,302 B2 | 8/2017 | Young et al. |
| 9,718,434 B2 | 8/2017 | Hector, Jr. et al. |
| 9,724,877 B2 | 8/2017 | Flitsch et al. |
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaathausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |

(56) References Cited

U.S. PATENT DOCUMENTS

| | | |
|---|---|---|
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |
| 10,268,181 B1 | 4/2019 | Nevins |
| 10,269,225 B2 | 4/2019 | Velez |
| 10,272,860 B2 | 4/2019 | Mohapatra et al. |
| 10,272,862 B2 | 4/2019 | Whitehead |
| 10,275,564 B2 | 4/2019 | Ridgeway et al. |
| 10,279,580 B2 | 5/2019 | Evans et al. |
| 10,285,219 B2 | 5/2019 | Fetfatsidis et al. |
| 10,286,452 B2 | 5/2019 | Buller et al. |
| 10,286,603 B2 | 5/2019 | Buller et al. |
| 10,286,961 B2 | 5/2019 | Hillebrecht et al. |
| 10,289,263 B2 | 5/2019 | Troy et al. |
| 10,289,875 B2 | 5/2019 | Singh et al. |
| 10,291,193 B2 | 5/2019 | Dandu et al. |
| 10,294,552 B2 | 5/2019 | Liu et al. |
| 10,294,982 B2 | 5/2019 | Gabrys et al. |
| 10,295,989 B1 | 5/2019 | Nevins |
| 10,303,159 B2 | 5/2019 | Czinger et al. |
| 10,307,824 B2 | 6/2019 | Kondoh |
| 10,310,197 B1 | 6/2019 | Droz et al. |
| 10,313,651 B2 | 6/2019 | Trevor et al. |
| 10,315,252 B2 | 6/2019 | Mendelsberg et al. |
| 10,336,050 B2 | 7/2019 | Susnjara |
| 10,337,542 B2 | 7/2019 | Hesslewood et al. |
| 10,337,952 B2 | 7/2019 | Bosetti et al. |
| 10,339,266 B2 | 7/2019 | Urick et al. |
| 10,343,330 B2 | 7/2019 | Evans et al. |
| 10,343,331 B2 | 7/2019 | McCall et al. |
| 10,343,355 B2 | 7/2019 | Evans et al. |
| 10,343,724 B2 | 7/2019 | Polewarczyk et al. |
| 10,343,725 B2 | 7/2019 | Martin et al. |
| 10,350,823 B2 | 7/2019 | Rolland et al. |
| 10,356,341 B2 | 7/2019 | Holzer et al. |
| 10,356,395 B2 | 7/2019 | Holzer et al. |
| 10,357,829 B2 | 7/2019 | Spink et al. |
| 10,357,957 B2 | 7/2019 | Buller et al. |
| 10,359,756 B2 | 7/2019 | Newell et al. |
| 10,369,629 B2 | 8/2019 | Mendelsberg et al. |
| 10,382,739 B1 | 8/2019 | Rusu et al. |
| 10,384,393 B2 | 8/2019 | Xu et al. |
| 10,384,416 B2 | 8/2019 | Cheung et al. |
| 10,389,410 B2 | 8/2019 | Brooks et al. |
| 10,391,710 B2 | 8/2019 | Mondesir |
| 10,392,097 B2 | 8/2019 | Pham et al. |
| 10,392,131 B2 | 8/2019 | Deck et al. |
| 10,393,315 B2 | 8/2019 | Tyan |
| 10,400,080 B2 | 9/2019 | Ramakrishnan et al. |

(56) References Cited

U.S. PATENT DOCUMENTS

| | | |
|---|---|---|
| 10,401,832 B2 | 9/2019 | Snyder et al. |
| 10,403,009 B2 | 9/2019 | Mariampillai et al. |
| 10,406,750 B2 | 9/2019 | Barton et al. |
| 10,412,283 B2 | 9/2019 | Send et al. |
| 10,416,095 B2 | 9/2019 | Herbsommer et al. |
| 10,421,496 B2 | 9/2019 | Swayne et al. |
| 10,421,863 B2 | 9/2019 | Hasegawa et al. |
| 10,422,478 B2 | 9/2019 | Leachman et al. |
| 10,425,793 B2 | 9/2019 | Sankaran et al. |
| 10,427,364 B2 | 10/2019 | Alves |
| 10,429,006 B2 | 10/2019 | Tyan et al. |
| 10,434,573 B2 | 10/2019 | Buller et al. |
| 10,435,185 B2 | 10/2019 | Divine et al. |
| 10,435,773 B2 | 10/2019 | Liu et al. |
| 10,436,038 B2 | 10/2019 | Buhler et al. |
| 10,438,407 B2 | 10/2019 | Pavanaskar et al. |
| 10,440,351 B2 | 10/2019 | Holzer et al. |
| 10,442,002 B2 | 10/2019 | Benthien et al. |
| 10,442,003 B2 | 10/2019 | Symeonidis et al. |
| 10,449,696 B2 | 10/2019 | Elgar et al. |
| 10,449,737 B2 | 10/2019 | Johnson et al. |
| 10,461,810 B2 | 10/2019 | Cook et al. |
| 2006/0108783 A1 | 5/2006 | Ni et al. |
| 2014/0277669 A1 | 9/2014 | Nardi et al. |
| 2017/0113344 A1 | 4/2017 | Schönberg |
| 2017/0341309 A1 | 11/2017 | Piepenbrock et al. |
| 2018/0250889 A1* | 9/2018 | Czinger ............... B29C 64/106 |

FOREIGN PATENT DOCUMENTS

| | | |
|---|---|---|
| WO | 1996038260 A1 | 12/1996 |
| WO | 2003024641 A1 | 3/2003 |
| WO | 2004108343 A1 | 12/2004 |
| WO | 2005093773 A1 | 10/2005 |
| WO | 2007003375 A1 | 1/2007 |
| WO | 2007110235 A1 | 10/2007 |
| WO | 2007110236 A1 | 10/2007 |
| WO | 2008019847 A1 | 2/2008 |
| WO | 2007128586 A3 | 6/2008 |
| WO | 2008068314 A2 | 6/2008 |
| WO | 2008086994 A1 | 7/2008 |
| WO | 2008087024 A1 | 7/2008 |
| WO | 2008107130 A1 | 9/2008 |
| WO | 2008138503 A1 | 11/2008 |
| WO | 2008145396 A1 | 12/2008 |
| WO | 2009083609 A2 | 7/2009 |
| WO | 2009098285 A1 | 8/2009 |
| WO | 2009112520 A1 | 9/2009 |
| WO | 2009135938 A1 | 11/2009 |
| WO | 2009140977 A1 | 11/2009 |
| WO | 2010125057 A2 | 11/2010 |
| WO | 2010125058 A1 | 11/2010 |
| WO | 2010142703 A2 | 12/2010 |
| WO | 2011032533 A1 | 3/2011 |
| WO | 2014016437 A1 | 1/2014 |
| WO | 2014187720 A1 | 11/2014 |
| WO | 2014195340 A1 | 12/2014 |
| WO | 2015193331 A1 | 12/2015 |
| WO | 2016116414 A1 | 7/2016 |
| WO | 2017036461 A1 | 3/2017 |
| WO | 2019030248 A1 | 2/2019 |
| WO | 2019042504 A1 | 3/2019 |
| WO | 2019048010 A1 | 3/2019 |
| WO | 2019048498 A1 | 3/2019 |
| WO | 2019048680 A1 | 3/2019 |
| WO | 2019048682 A1 | 3/2019 |

* cited by examiner

ADDITIVELY MANUFACTURING STRUCTURES FOR INCREASED SPRAY FORMING RESOLUTION OR INCREASED FATIGUE LIFE

BACKGROUND

Field

The present disclosure relates generally to manufacturing techniques, and more specifically 3-D-printing methods using spray forming to additively manufacture parts with at least one of increased spray forming accuracy, resolution, and/or increased fatigue life.

Background

Key technological developments and advances in manufacturing have been made in recent years with the increasingly widespread use of three dimensional (3-D) printing for a variety of applications. Such applications are especially prevalent in the context of manufacturing numerous types of sophisticated mechanical structures. Similar advances have recently been made, and milestones achieved, relative to the advancement of 3-D printing technologies themselves. The plethora of modern 3-D printing techniques that have been the subject of such recent advances include, for example, stereolithography (SLA), digital light processing (DLP), fused deposition modeling (FDM), selective laser sintering (SLS), selective laser melting (SLM), and the like.

Various limitations with existing 3-D-printing applications persist. As an illustration, 3-D printing using FDM and other techniques rely on the successive deposition of layers of material. As a result of this layer-by-layer deposition technique, printed parts may exhibit a stair-stepped effect, especially with respect to angled surfaces. Where the printed part is, by way of example, a panel such as a hood for a vehicle, the part may fall out of applicable vehicular requirements and specifications. Thus these printed parts may require additional sanding, machining, or other finishing steps to make them smooth.

For example, using conventional manufacturing techniques, a panel may be 3-D printed. Thereafter, the part may be prepared for a second manufacturing step wherein the stair-stepped effect is reduced or eliminated using sanding, hand spray forming, or some other process. Requiring separate manufacturing steps to produce a smooth 3-D-printed part may result in manufacturing inefficiencies, added complexity, and increased cost. Additionally, since in the conventional method the stair-stepped effect is often eliminated using techniques not calibrated with the 3-D printer that produced the part, accuracy and/or resolution in the resulting printed part may be compromised.

SUMMARY

Several aspects of methods will be described more fully hereinafter with reference to three-dimensional (3-D) printing techniques. One aspect relates to manufacturing techniques that include 3-D-printing methods using spray forming to along with spray forming techniques to additively manufacture parts with at least one of increased spray forming accuracy, resolution, and/or increased fatigue life.

Systems, apparatus, and method for forming a structure are disclosed. An apparatus may be configured to receive instructions for printing at least one portion of the structure. The instructions may be based on a data model of the structure. The apparatus may be configured to receive material and print the at least one portion of the structure based on the instructions. The printing comprising spray forming the material to produce the at least one portion of the structure.

It will be understood that other aspects of 3-D printing using spray forming will become readily apparent to those skilled in the art from the following detailed description, wherein it is shown and described only several embodiments by way of illustration. As will be realized by those skilled in the art, the additively manufactured structures for increased spray forming resolution or increased fatigue life are capable of other and different embodiments and its several details are capable of modification in various other respects, all without departing from the invention. Accordingly, the drawings and detailed description are to be regarded as illustrative in nature and not as restrictive.

BRIEF DESCRIPTION OF THE DRAWINGS

Various aspects of 3-D printing using spray forming will now be presented in the detailed description by way of example, and not by way of limitation, in the accompanying drawings, wherein.

DETAILED DESCRIPTION

The detailed description set forth below in connection with the appended drawings is intended to provide a description of various exemplary embodiments of 3-D printing using spray forming along with spray forming techniques to additively manufacture parts with at least one of increased spray forming accuracy, resolution, and/or increased fatigue life and is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Figure 1B:
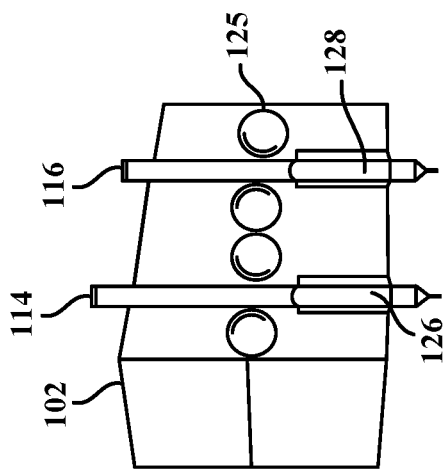
FIGS. 1A-B illustrate a diagram of a 3-D printer using fused deposition modeling (FDM).
Figure 1A:
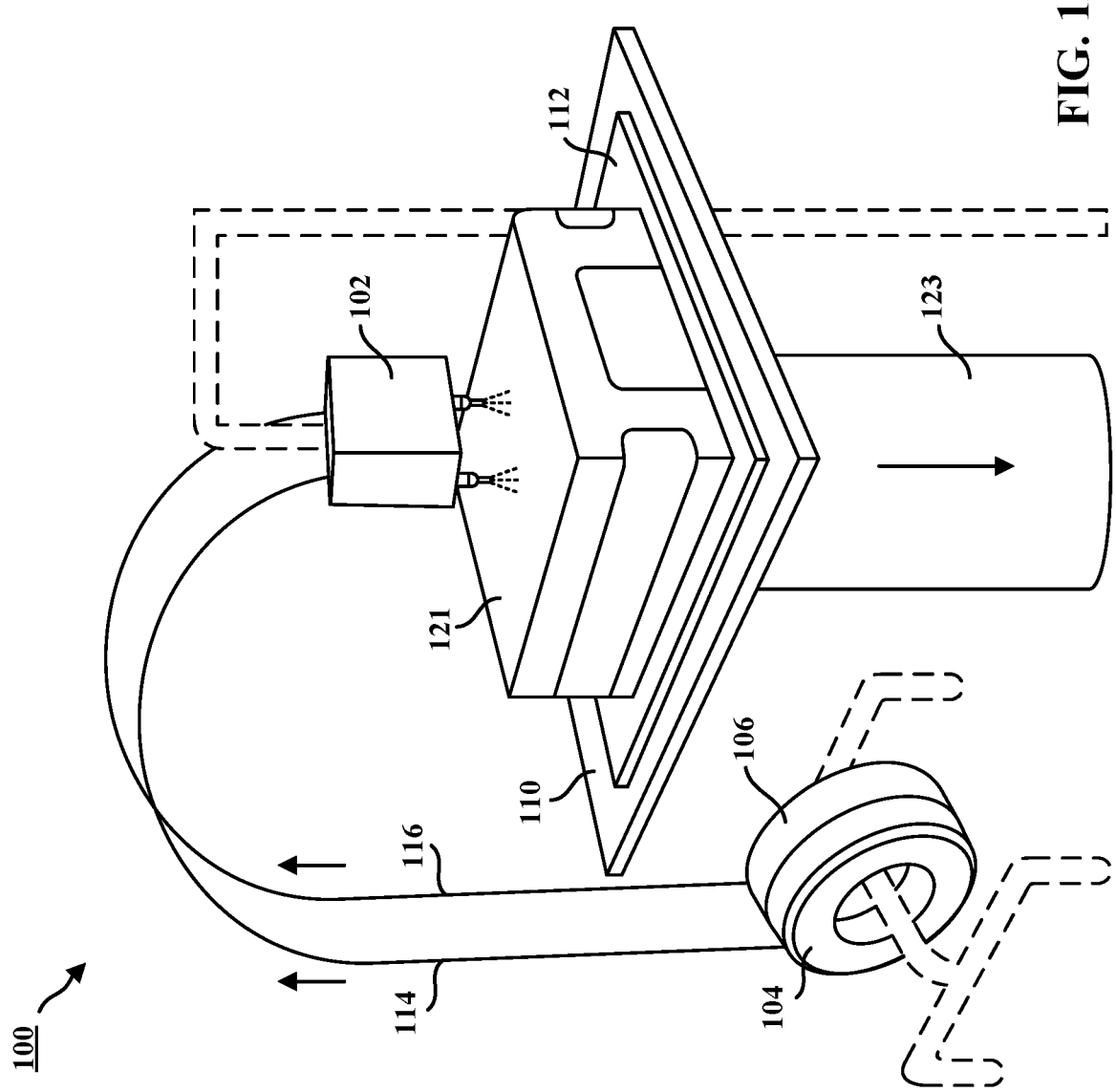

FIGS. 1A-B illustrate a diagram of a 3-D printer that may use fused deposition modeling (FDM). FDM is an additive manufacturing technique wherein a thermoplastic or other material, e.g., metal, may be extruded through a temperature-controlled print nozzle 102. The print nozzle 102 can be moved in both horizontal and vertical directions by a mechanical device that is under the control of a computer-aided manufacturing (CAM) software package. The 3-D part to be constructed is built one layer at a time, and the layers successively overlap each other in a prescribed manner to form a part 121.

The 3-D printer of FIG. 1A also includes a first spool 104 for providing a first material 106 that is fed to the extrusion head 102 and a second spool for providing a second material that is fed to the extrusion head 102. While in some configurations the material 114 may constitute a build material for forming the successive layers of the part and the material 116 a support material for providing temporary support to accommodate spatial vacancies created by the predetermined shapes of certain structures whose shape may otherwise be compromised by gravity prior to solidifying, the 3-D printing techniques contemplated in this disclosure may obviate the need for a support material by using complex matrix arrays as backing structures.

3-D printer 100 may also include a substrate or base 112 upon which the printing may occur, and a vertically movable build platform 110. During the 3-D printing process wherein the material 114 is extruded onto a surface of part 121 to form successive layers, the build platform 110 may be configured under software control to gradually move lower in the vertical direction (as indicated by the arrow on support arm 123) to accommodate the space occupied by the increasing number of layers of part 121.

FIG. 1B shows an expanded view of extrusion head 102. Materials 114 and 116 may be fed using rotating drive wheels 125 into extrusion nozzles 126 and 128, respectively. The materials 114 and 116 are melted by the application of heat in respective extrusion nozzles 126 and 128 and thereupon ejected under software control from the nozzles onto the substrate 110, or onto the layers previously disposed on the substrate.

While an FDM printing technique has been described here for illustration purposes, the disclosure herein is not so limited, and any suitable 3-D printing technique may be employed in connection with the description that follows.

In some aspects, the 3-D printer 100 of FIGS. 1A-1B may be an apparatus for forming a structure. The structure may include a first portion, a second portion, and a structural joint, the apparatus. The 3-D printer 100 may include a first receiver configured to receive the first portion. For example, the first receiver may be a first portion of the build platform 110. The 3-D printer 100 may include a second receiver configured to receive the second portion. For example, the second receiver may be a second portion of the build platform 110. The 3-D printer 100 may include a material receiver configured to receive material. For example, the head 102 may be the material receiver configured to receive material. The 3-D printer 100 may be computer controlled and may include a memory and at least one processor coupled to the memory. The processor may be configured to receive instructions for printing the structural joint. The instructions may be based on a data model of the structural joint. Additionally, the at least one processor may control printing of the structural joint based on the instructions, the printing comprising spray forming the material to produce the structural joint, the structural joint connecting the first portion to the second portion.

In an aspect, the 3-D printer 100 may provide means for receiving instructions for printing at least one portion of the structure, the instructions based on a data model of the structure, means for receiving material, and means for printing the at least one portion of the structure based on the instructions, the printing comprising spray forming the material to produce the structure. For example, the 3-D printer 100 may be controlled by electronic circuitry, such as a one or more processors, microprocessors, controllers, digital logic circuits, other digital or analog circuitry, or some combination of these. The electronic circuitry may provide means for receiving instructions for printing at least one portion of the structure. The 3-D printer 100 may also provide means for receiving material. For example, a first material 106 that is fed to the extrusion head 102 and a second spool for providing a second material that is fed to the extrusion head 102. Accordingly, the spools may receiving material. The spool may be used so that the extrusion head may receive and extrude the material. The 3-D printer 100 may also provide the means for printing the at least one portion of the structure based on the instructions.

Figure 2:
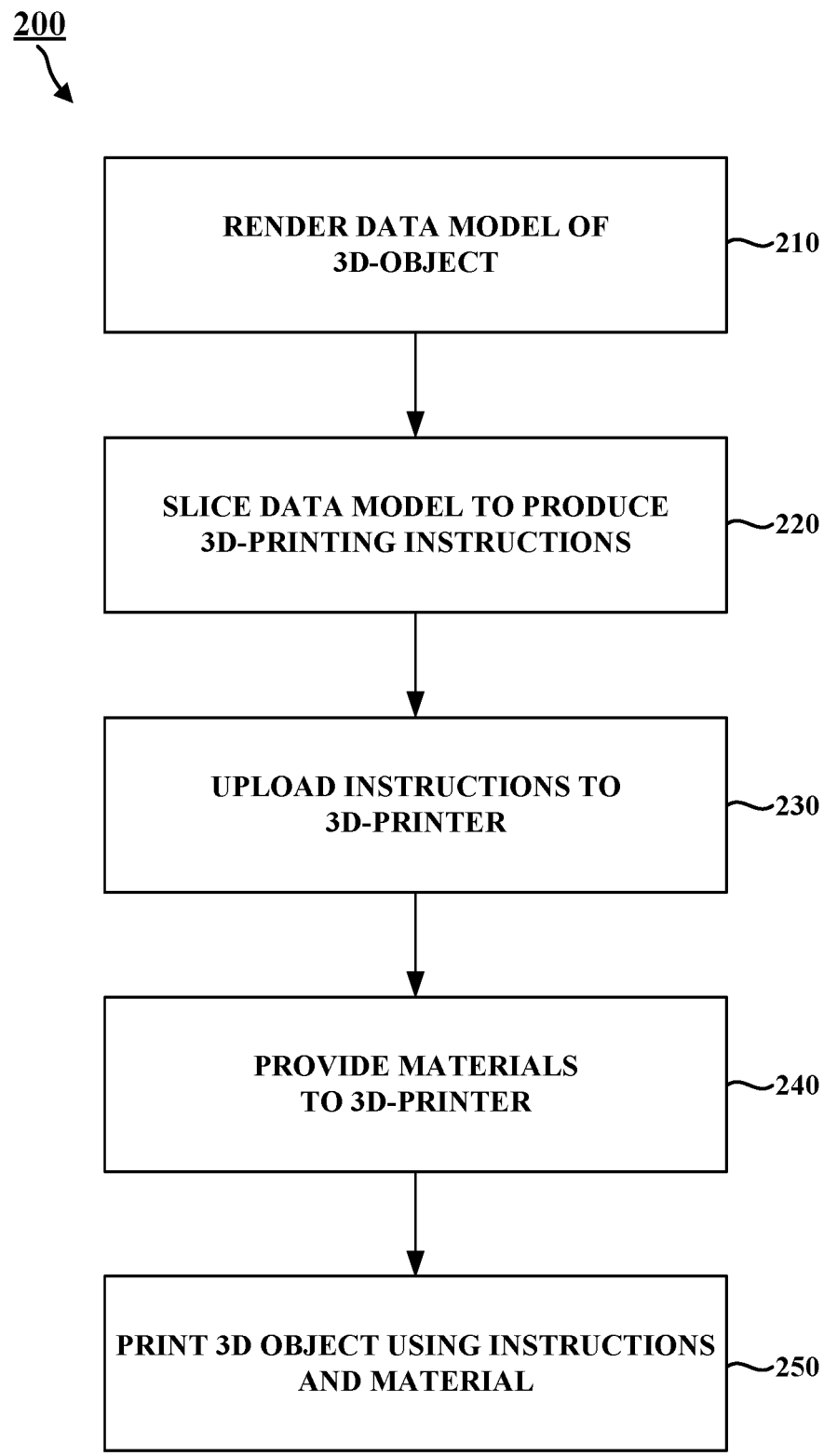
FIG. 2 is a flow diagram illustrating an exemplary process of 3-D printing.

FIG. 2 is a flow diagram 200 illustrating an exemplary process of 3-D printing. A data model of the desired 3-D object to be printed is rendered (step 210). A data model is a virtual design of the 3-D object. Thus, the data model may reflect the geometrical and structural features of the 3-D object, as well as its material composition. The data model may be created using a variety of methods, including 3-D scanning, 3-D modeling software, photogrammetry software, and camera imaging.

3-D scanning methods for creating the data model may also use a variety of techniques for generating a 3-D model. These techniques may include, for example, time-of-flight, volumetric scanning, structured light, modulated light, laser scanning, triangulation, and the like.

3-D modeling software, in turn, may include one of numerous commercially available 3-D modeling software applications. Data models may be rendered using a suitable computer-aided design (CAD) package, for example in an STL format. STL files are one example of a file format associated with commercially available CAD software. A CAD program may be used to create the data model of the 3-D object as an STL file. Thereupon, the STL file may undergo a process whereby errors in the file are identified and resolved.

Following error resolution, the data model can be "sliced" by a software application known as a slicer to thereby produce a set of instructions for 3-D printing the object, with the instructions being compatible and associated with the particular 3-D printing technology to be utilized (step 220). Numerous slicer programs are commercially available. Generally, the slicer program converts the data model into a series of individual layers representing thin slices (e.g., 100 microns thick) of the object being printed, along with a file containing the printer-specific instructions for 3-D printing these successive individual layers to produce an actual 3-D printed representation of the data model.

A common type of file used for this purpose is a G-code file, which is a numerical control programming language that includes instructions for 3-D printing the object. The G-code file, or other file constituting the instructions, is uploaded to the 3-D printer (step 230). Because the file containing these instructions is typically configured to be operable with a specific 3-D printing process, it will be appreciated that many formats of the instruction file are possible depending on the 3-D printing technology used.

In addition to the printing instructions that dictate what and how an object is to be rendered, the appropriate physical materials necessary for use by the 3-D printer in rendering the object are loaded into the 3-D printer using any of several conventional and often printer-specific methods (step 240). In fused deposition modeling (FDM) 3-D printers, as indicated above, materials may be loaded as filaments on spools, which are placed on one or more spool holders. The filaments are typically fed into an extruder apparatus which, in operation, heats the filament into a melted form before ejecting the material onto a build plate or other substrate. In selective laser sintering (SLS) printing and other methods, the materials may be loaded as powders into chambers that feed the powder to a build platform. Depending on the 3-D printer, other techniques for loading printing materials may be used.

The respective data slices of the 3-D object are then printed based on the provided instructions using the material(s) (step 250). In 3-D printers that use laser sintering, a laser scans a powder bed and melts the powder together where structure is desired and avoids scanning areas where the sliced data indicates that nothing is to be printed. This process may be repeated thousands of times until the desired structure is formed, after which the printed part is removed from a fabricator. In fused deposition modeling, as described above, parts are printed by applying successive layers of model and support materials to a substrate. In general, any suitable 3-D printing technology may be employed for purposes of this disclosure.

Like other 3-D printing techniques, the FDM technique has a minimum layer resolution, which may in some configurations be on the order of 0.127 mm or thereabouts, depending on the printer resolution and other factors. As a consequence of this minimum resolution, it becomes apparent that the attempted 3-D printing of an angled surface will result in often unwanted "stair-stepped" artifacts caused by the finite thickness of the successive layers.

Figure 3A:
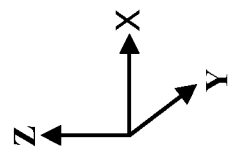
FIGS. 3A, 3B, and 3C are illustrations of a desired part and a build plate supporting a resulting 3-D printed part.
Figure 3A:
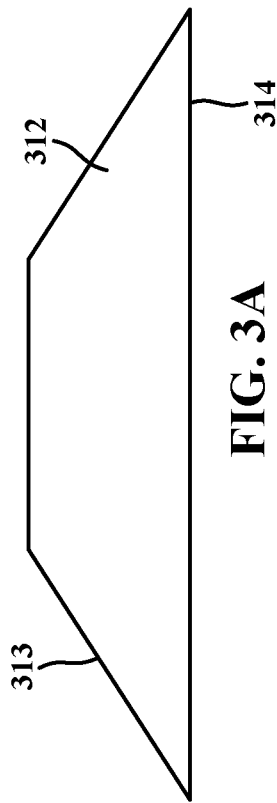
Figure 3B:
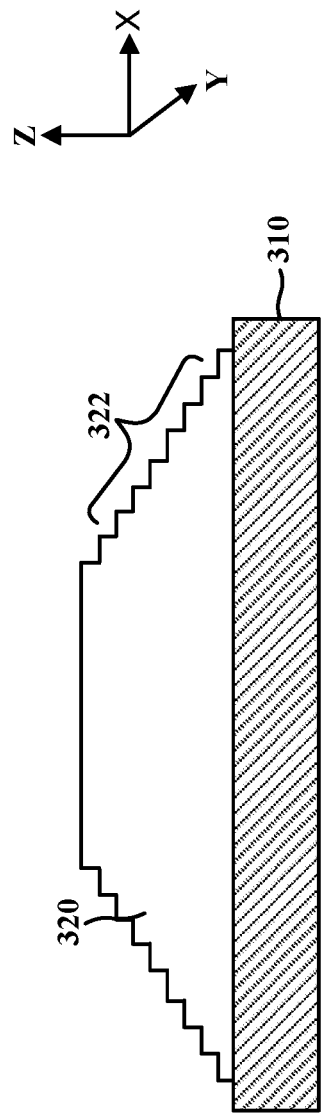
Figure 3C:
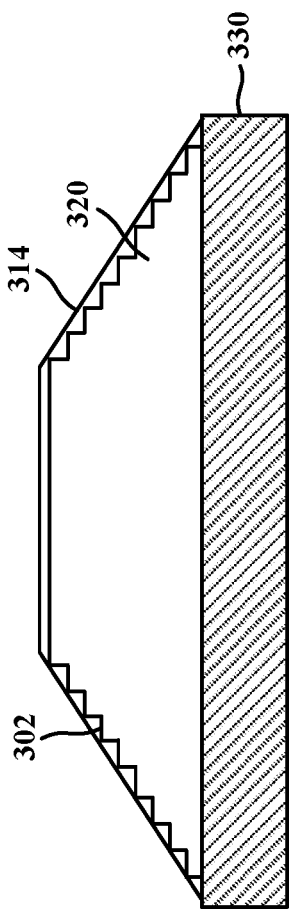

This phenomenon can be appreciated with reference to FIGS. 3A-C, which are illustrations of a desired part 312 and a build plate 310 supporting a resulting 3-D printed part 320. FIG. 3A is a visual representation of a data model of a part 312 to be printed. The part 312 for purposes of this illustration has a first surface 314 that is substantially flat and a second surface 313 that is angled on both ends and that has a flat top surface. The part 312 may, for example, be a panel for use in a transport structure where the surface 313 is intended to represent an exterior portion of the panel such as the external portion of a car door.

FIG. 3B shows part 320 that is 3-D printed on substrate 310 based on the data model of part 312. As can be seen, due to the finite minimal thickness of the layers being deposited, the 3-D printing process generates a stair-stepped effect 322 on the surface of part 320 that is intended to represent one of the angled surfaces 313 (FIG. 3A). As a result, the exterior surface of a part such as a body panel may have undesirable and unaesthetic jagged edges that must be smoothed out by some other process. Depending on the part being constructed and the specific implementation, the stair-stepped effect 322 that results may add further complications. For example, it may render the part non-compliant with specifications or applicable regulations, or non-functional for a particular purpose.

FIG. 3C shows the part 320 after going through an additional manufacturing step. In particular, the stair-stepped effect 322 is reduced to form substantially flat surfaces 202 and 304 of part 320. One such manufacturing step may involve workers removing part 320 from the 3-D printer, depositing part 320 on a second substrate 330 and applying a hand spray forming technique to smooth the stair-stepped effect.

Conventional spray forming involves casting metal components with homogeneous microstructures via the inert gas atomization of a liquid metal stream into droplets and the deposition of semi-solid sprayed droplets onto a shaped substrate. The substrate collects the droplets and solidifies them into a coherent preform. In one example of the process, an alloy is melted, normally in an induction furnace, then the molten metal is slowly poured through a conical tundish into a small-bore ceramic nozzle. The molten metal exits the furnace and is broken up into droplets by an atomizer. The droplets then proceed downwards to impact a substrate. The process is arranged such that the droplets strike the substrate while in the semi-solid condition. This process provides sufficient liquid fraction to 'stick' the solid fraction together. Deposition continues, gradually building up a spray formed part, such as a billet, of metal on the substrate. Spray forming may use a chamber in the shape of the part to be formed.

Spray forming may involve applying finishing procedures on metal structures as indicated above or forming metal structures in a chamber. More specifically, metal parts may be spray formed in a temperature controlled chamber, which is typically in a shape that is consistent with that of the final part. In current metal spray forming processes, dedicated equipment is needed such as the chamber, nozzle, atomizer, etc. In addition, the metal parts are limited by the constraints of the chamber and can only be shaped to substantially adhere to the geometry of the chamber.

Accordingly, in one embodiment, a spray forming technique is incorporated as part of a 3-D printer. The 3-D printer includes a flexible, computer-controlled nozzle having six degrees of freedom that is capable of being manipulated in all three X-Y-Z directions and inclined at a variety of angles relative to the printer build plate. The 3-D printer incorporating the spray former may, depending on the embodiment, be used for both for finishing of surfaces of existing parts and for wholesale construction of parts. In other exemplary embodiments, the spray forming 3-D printer is not limited to spray forming of metals and may additionally or alternatively employ spray forming of plastics and other materials, e.g., metal. Thus, the 3-D printer may incorporate a spray former that broadly includes one or more mechanical assemblies for converting a desired material into droplets and spray forming the material in a manner specified by the 3-D printing instructions and/or the CAM program associated with the 3-D printer.

Figure 4:
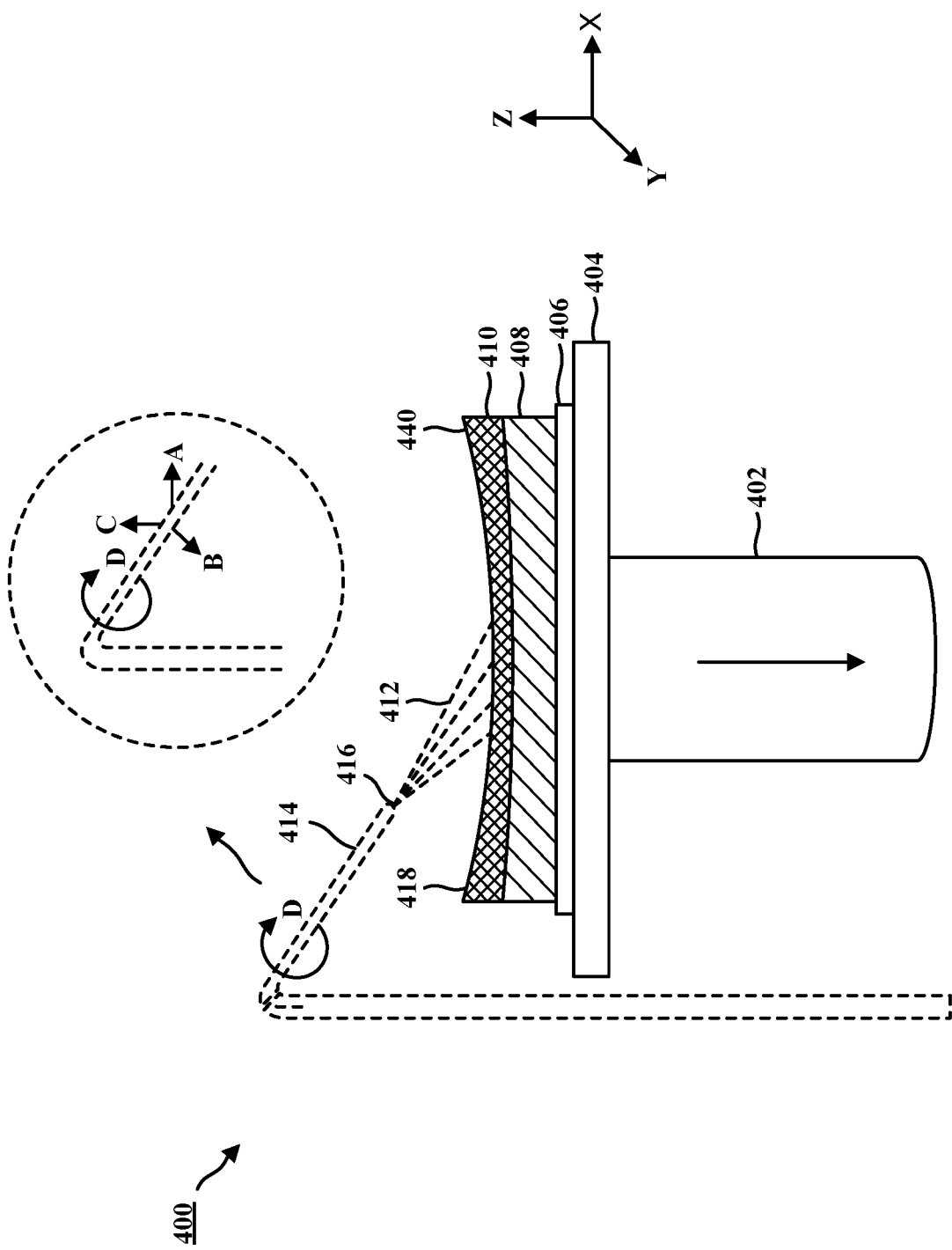
FIG. 4 is a diagram of a 3-D printer employing spray forming.

FIG. 4 shows a conceptual diagram of a 3-D printer 400 employing spray forming. The 3-D printer includes support arm 402, build plate 404, and substrate 406. In this embodiment, a tooling shell 408 is disposed on a surface of substrate 406. In one exemplary embodiment, the tooling shell 408 was previously machined or 3-D printed and was placed on the substrate 408 after its construction.

In another exemplary embodiment as described further below with reference to FIGS. 5 and 6, the tooling shell 408 may be 3-D printed on 3-D printer 400. For example, 3-D printer 400 may include a conventional computer-controlled print extruder (not shown) which may 3-D print the mold using any of a variety of known methods (SLS, FDM, etc.). In another exemplary embodiment, the mold is spray formed using 3-D printer 400.

A robotic arm 414 under computer control of the 3-D printer may be used to spray form a part 410, such as a panel, on a surface of the tooling shell 408. In other exemplary embodiments, the spray forming is deposited directly on substrate 406 to spray form the part 410. The nozzle 416 of the robotic arm 414 shoots droplets 412 of material onto the tooling shell 408 to thereby create the part 410 as described above.

As the part 410 is formed by the 3-D printer using spray forming, it will be appreciated that the angled or inclined sections 418 and 420 of part 410 can be created without any appreciable stair-stepped effect. Accordingly, the use of spray forming as part of, and under computer control of, the 3-D printer enables a manufacturer to form a part 410 that requires no further finishing step. Accordingly, a smoothened part may be provided in a single step or on a single 3-D printer.

In an exemplary embodiment, robotic arm 414 can be manipulated in a variety of directions and angles. For example, robotic arm 414 may be moved in one or more of the A, B or C directions (or directions at any point in between), which may correspond respectively to coordinate axes X, Y, Z of the 3-D printer. For example, in another exemplary embodiment, robotic arm 414 can be inclined at substantially any angle in order to perform spray forming at a variety of angles. In yet another embodiment, robotic arm 414 may be configured to rotate or twist as shown by the arrow and corresponding designation D. In an exemplary embodiment, the robotic arm 414 is equipped with six degrees of freedom. In one embodiment, the robotic arm 414 is designed to be thin relative to the generally bulky print extruder 502 and associated mechanical assembly. This gives the robotic arm 414 additional flexibility to move about the substrate.

Conventional 3-D printers that perform plastic extrusion generally have a limited ability to alter angles of the print extruder. Such conventional printers typically employ a pivot point for the print nozzle in lieu of a thin, flexible robotic arm. For this reason, the extruders on 3-D printers typically do not have the six degrees of freedom such that they can have significant flexibility in their degrees of movement. One reason for this limitation is that conventional print nozzles typically have thicker diameters and cannot be manipulated easily about different axes, in contrast to the sleek robotic arm 414, whose range of diameters may be made very thin due in part to the intrinsic nature of the spray forming technique and the small size of droplets required from the spray nozzle.

In addition, due to the thickness of the extruded material and other constraints, material extruded from conventional printers may be adversely affected by gravity when the extruder angle is changed, for example, to a slightly angled position to deposit material. That is, the print extruder in the conventional 3-D printer is often bulky, carries more inertia, and is limited in motion due to its pivot point connection to the remainder of the extrusion system, so that its flexibility to change angles and directions are accordingly limited. This phenomenon is similar in principle to attempting to write upside down with a ballpoint pen. 3-D printing using spray forming lacks this limitation. The spray forming technologies enables the 3-D printer to spray the light droplets on the substrate or part at essentially any angle, including in an upward direction, and the spray mechanic is not substantially adversely affected by gravity.

Because the robotic arm 414 and spray forming capability is incorporated as part of the 3-D printer, the arm 414 can be controlled and directed under computer control using instructions provided directly to the 3-D printer. In addition, in contrast to the conventional spray forming method wherein a chamber constrains the part formation to adhere to a single or a limited geometry, the 3-D printer as disclosed herein can spray form parts in three dimensions, with such parts having a variety of possible geometries and features under software control.

The mechanical assembly of the robotic arm 414 and printer may vary depending on the embodiment. Where spray forming of metals is performed, the assembly may incorporate a mechanism for heating the metal, an atomizer, and other elements. In another embodiment, robotic arm 414 of the 3-D printer may be configured to spray resins onto a mold or a substrate for forming or finishing parts. Generally, in considering the spray forming of different types of materials, molten materials should not be overly viscous to thereby render them too difficult for nozzle 416 to eject the droplets. Accordingly, in an exemplary embodiment, nozzle 416 of robotic arm 414 may include an assembly for adjusting the viscosity of the target material to be used in the spray forming process. In one embodiment, the assembly may be dynamically adjusted according to software as a function of the material to be used in the spray forming process. In addition, for plastics, a heating mechanism may be included in or proximate to nozzle 416 for facilitating the flow of the material.

Where thermoset resins are used, the resin and the hardener are generally mixed in some ratio and then applied. Pre-mixing the resin and the hardener and then attempting to spray form the resulting viscous material gives rise to inherent difficulties. For example, pre-mixing the resin and hardener and spray forming the combined material may cause the material to cure within the nozzle, thereby clogging the nozzle.

Accordingly, in another exemplary embodiment, robotic arm 414 may include two nozzles 416 (only one shown), each which constitutes a separate spray forming head. A first such nozzle may spray the resin and the second nozzle may spray the hardener. This technique obviates the difficulties inherent in pre-mixing and spraying the combined resin and hardener.

The above-described 3-D printing techniques can be used either to smooth (finish) a part such as a panel using spray forming or to create a part.

In spray forming plastics, the diameter of the nozzle 416 is generally very small, in some embodiments being on the order of approximately 50 μm. Because the diameter of nozzle 416 is small, the corresponding thickness of the material exiting nozzle 416 may be negligible, such that substantially no stair-stepped effect is observed when 3-D printing parts using the spray forming technique.

The robotic arm 414 is advantageous for incorporation into the 3-D printer 400 for use in spray forming because, among other reasons, such robotic assemblies may be controlled by a data model and related instructions as are used in 3-D printers.

Referring back to FIG. 4, in an example where the part 410 to be formed constitutes an exterior body panel of a vehicle, the material forming the panel can be sprayed over the 3-D printed tooling shell 408 (or the substrate 406 in other embodiments). In this manner, imperfections that arise due to surface properties of the 3-D printed tooling shell 408 are present only on the B side of the final panel where the part 410 meets the surface of tooling shell 408. In contrast, the A side (surface 418, 420 of part 410) of the panel may be made to be substantially flawlessly smooth, thereby satisfying Class A vehicular surface requirements.

In another exemplary embodiment, the 3-D printer as described above can be used to spray resin on metal or plastic 3-D printed tools to smoothen the surface of the tools.

In the embodiments involving spray forming of metals, various techniques and processes may be suitable for use in conjunction therewith including plasma deposition, physical vapor deposition, chemical vapor deposition, and the like.

Using the techniques described herein, smooth metal or plastic parts and panels having complex geometries can be spray formed from the ground up under software control of the printers. Layers can be sprayed from a build plate 404 or, alternatively, a first material can be used as a base 406 and a second material can be used for the spray forming process.

In another exemplary embodiment, a spray forming mechanism is integrated with a conventional 3-D print extruder to form a single 3-D printer. The 3-D printer according to this exemplary embodiment is capable of dual (or multiple) functions; namely, a conventional extruder (such as SLS, FDM, etc.) can be used to 3-D print a part and a spray former can be used either to form parts or to provide finishing for the part printed by the conventional print extruder. Thus, spray forming may be used to form various structures.

In an aspect, the 3-D printer 400 may provide means for receiving instructions for printing at least one portion of the structure, the instructions based on a data model of the structure, means for receiving material, and means for printing the at least one portion of the structure based on the instructions, the printing comprising spray forming the material to produce the structure. For example, the 3-D printer 400 may be controlled by electronic circuitry, such as a one or more processors, microprocessors, controllers, digital logic circuits, other digital or analog circuitry, or some combination of these. The electronic circuitry may provide means for receiving instructions for printing at least one portion of the structure. The 3-D printer 400 may also provide means for receiving material, such as spools or other material receiving aspects. The 3-D printer 400 may also provide the means for printing the at least one portion of the structure based on the instructions.

Figure 5:
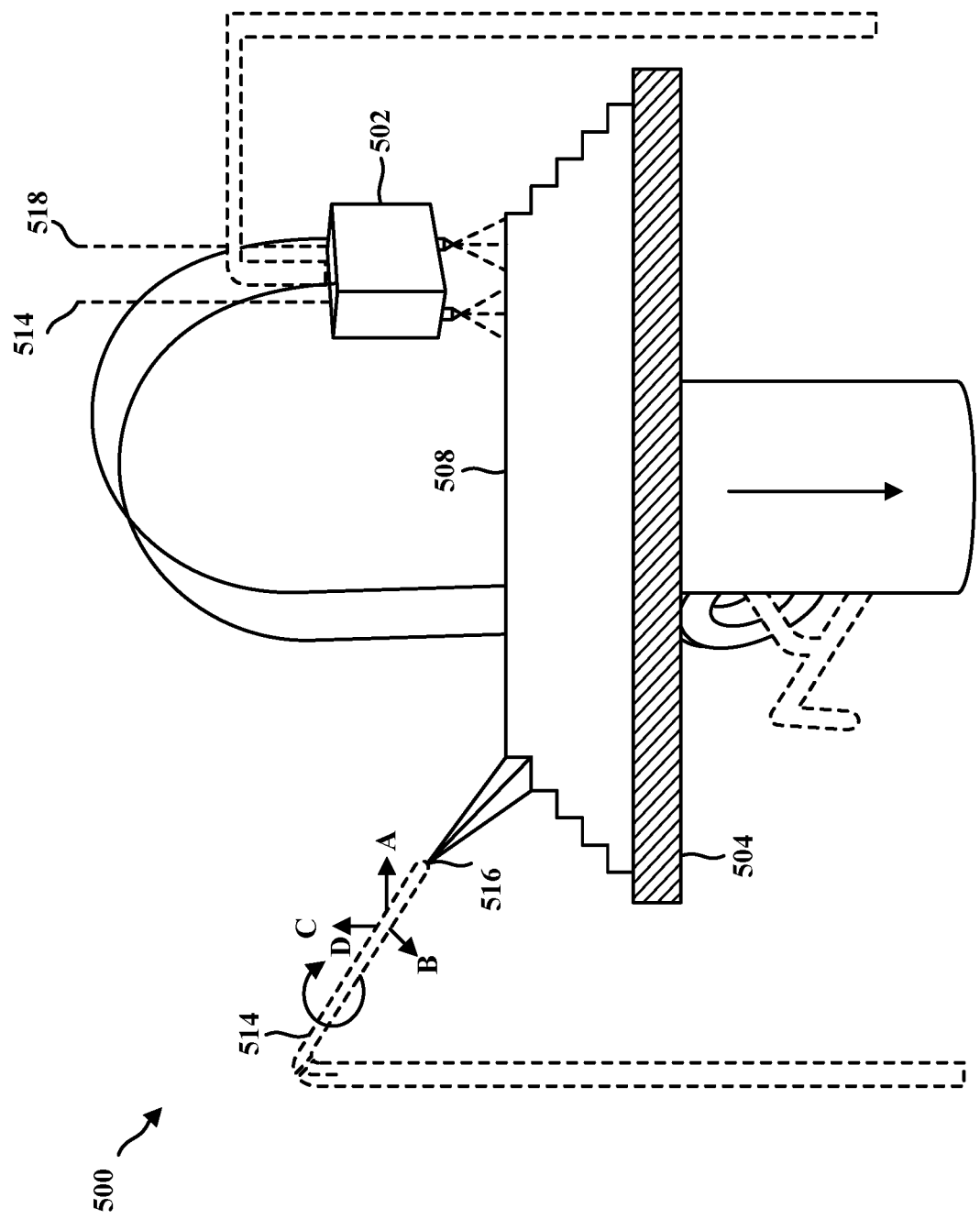
FIG. 5 is a diagram of a 3-D printer integrating spray forming and fused deposition modeling (FDM) printing.

FIG. 5 shows a diagram of a 3-D printer 500 integrating spray forming and FDM printing capability. While an FDM assembly is shown for purposes of illustration, it will be appreciated that any conventional 3-D printing technique may be integrated with the spray forming mechanism. The spray forming mechanism includes robotic arm 514, nozzle 516, and associated control mechanism (not shown) guided by printer software. As previously shown with reference to FIG. 4, robotic arm 514 of FIG. 5 may be under control of the 3-D printer instructions and can be manipulated at a variety of angles and directions, including in the A, B, C, and D directions.

In the embodiment shown, part 508 is 3-D printed on build plate 504 (or an intervening substrate or foam base) using print extruder 502 and one or both of print materials 514 and 518. As discussed in connection with previous embodiments, the angled portions of part 508 are characterized by a stair-stepped effect, the scale of which is exaggerated here for clarity. After part 508 is 3-D printed via print extruder 502, nozzle 516 of robotic arm applies spray forming to finish the part and thereby reduce or eliminate the stair-stepped effect, such that part 508 will have smooth angled surfaces as noted previously with reference to FIGS. 5A and 5C. Depending on the embodiment, metals, plastics, or composites may be spray formed.

In an aspect, the 3-D printer 500 may provide means for receiving instructions for printing at least one portion of the structure, the instructions based on a data model of the structure, means for receiving material, and means for printing the at least one portion of the structure based on the instructions, the printing comprising spray forming the material to produce the structure. For example, the 3-D printer 500 may be controlled by electronic circuitry, such as a one or more processors, microprocessors, controllers, digital logic circuits, other digital or analog circuitry, or some combination of these. The electronic circuitry may provide means for receiving instructions for printing at least one portion of the structure. The 3-D printer 500 may also provide means for receiving material, such as spools or other material receiving aspects. The 3-D printer 500 may also provide the means for printing the at least one portion of the structure based on the instructions.

Figure 6A:
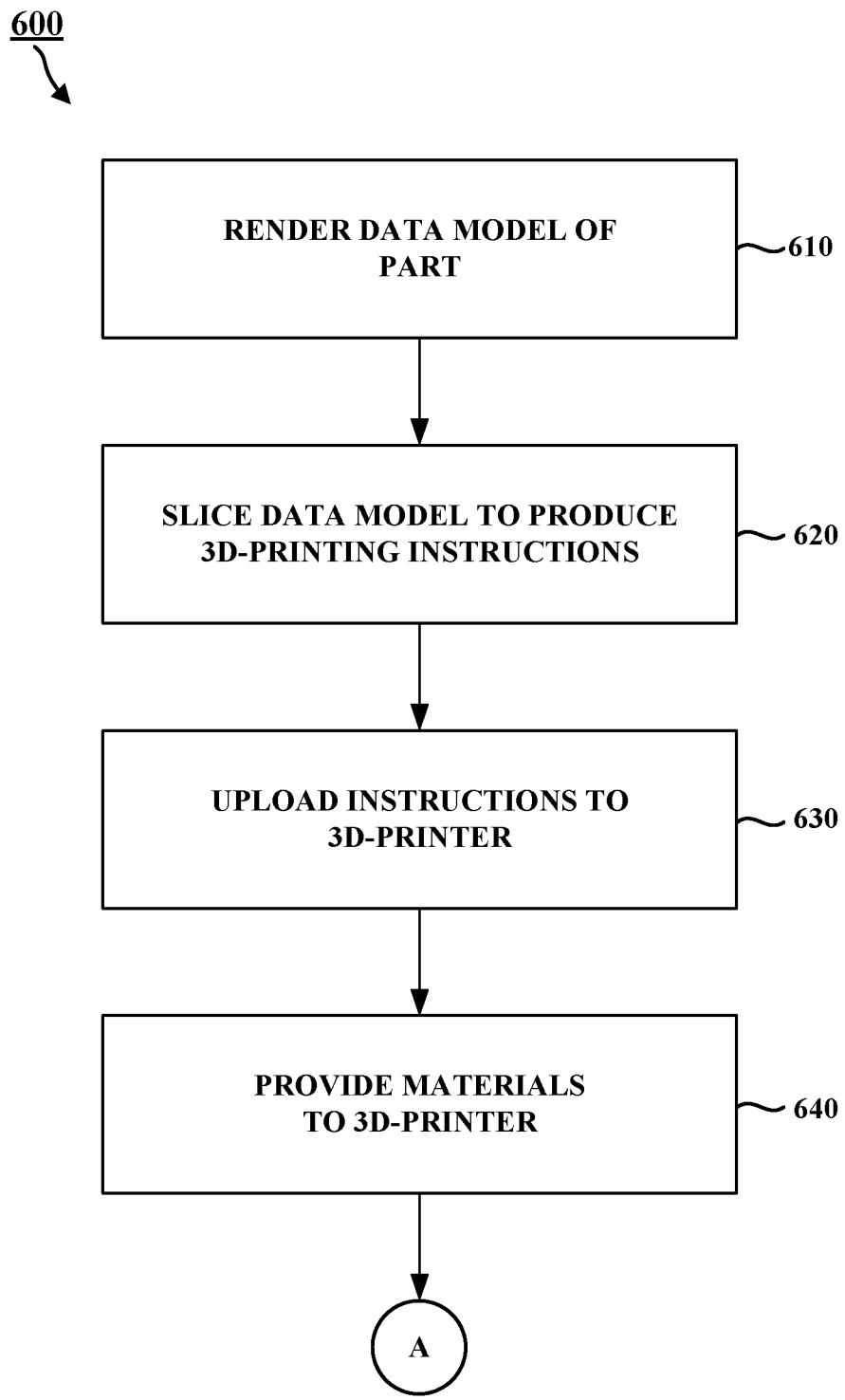
FIGS. 6A-B are a flow diagram illustrating an exemplary method for 3-D printing using spray forming.
Figure 6B:
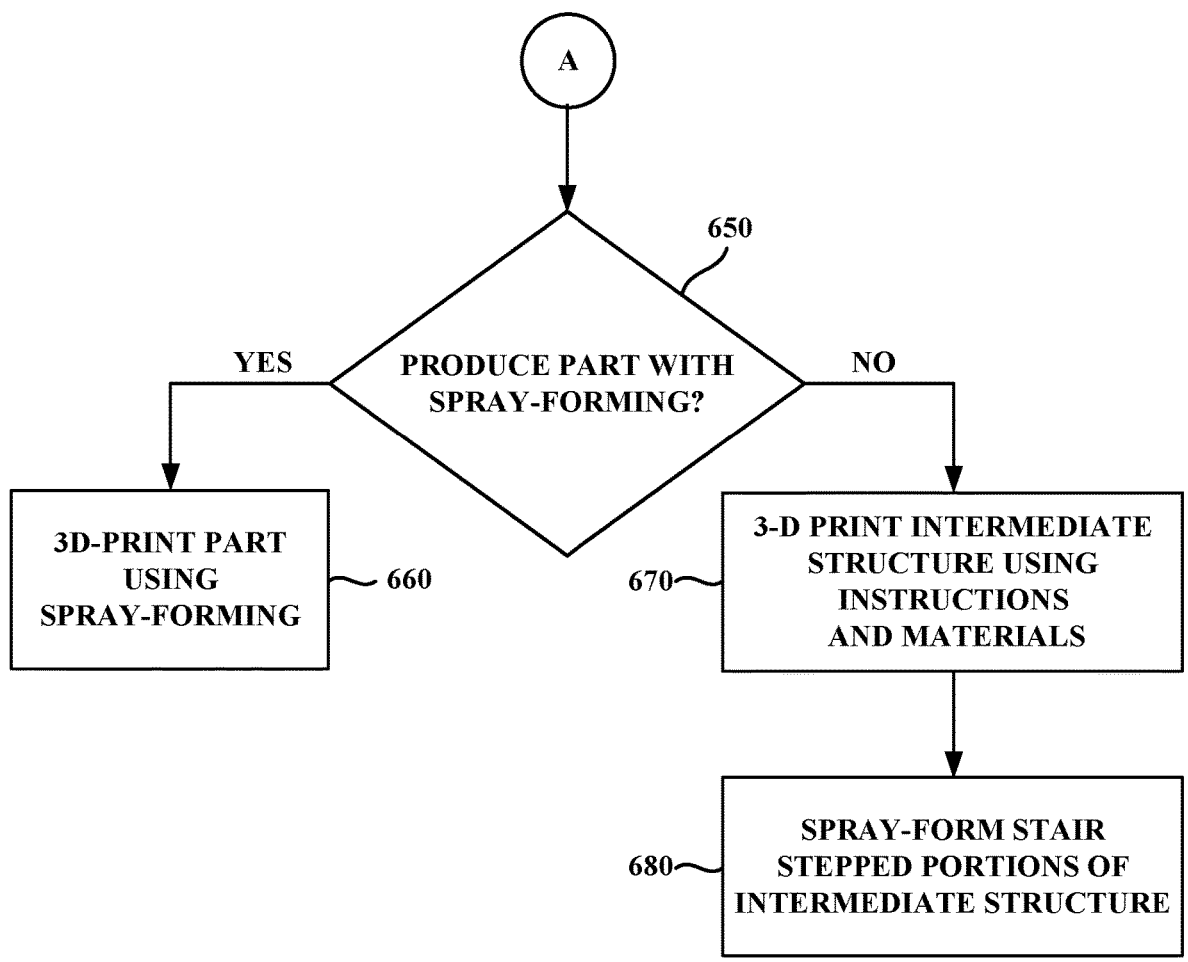

FIGS. 6A-B are a flow diagram 600 illustrating an exemplary method for 3-D printing using spray forming. Referring to FIG. 6A, at 610, a data model of the part to be printed is rendered. At 620, the data model is sliced into a plurality of layers to produce 3-D printing instructions. Depending on the application, these instructions may include instructions for conventional 3-D printing (such as SLS or FDM), spray forming, or both. At 630, the instructions are uploaded to the 3-D printer.

At 640, materials are provided to the 3-D printer 500 for use in 3-D printing the object. These materials may include one or more of plastics, metals, resins, and composites in their appropriate form for use in the specific 3-D printing technique employed. This step may also include providing materials for use in spray forming a part. In an exemplary embodiment, the materials are provided to different functional mechanisms within the 3-D printer. In other embodiments, the spray forming mechanism may draw its material from a common source as the conventional 3-D print head. It should be noted that step 640 need not occur in any particular order, and may occur prior to any of the steps 610-630 or later, as long as the material is made available at the actual time of printing the part.

Referring to FIG. 6B, at 650, the 3-D printer 500 may determine, based on the instructions, whether the part to be produced will be formed via spray forming (as in the application of material via robotic arm 514 and nozzle 516 in FIG. 5) or via a conventional 3-D printing technique (as in the application of one or more materials 514, 518 via print extruder 502 in FIG. 5). If it is determined that the part will be spray formed, then at 660, the 3-D printer 500 will form the part on substrate 504 or on another base plate. Conversely, if it is determined that the part will be 3-D printed using the conventional print extruder 502, then at step 670 the 3-D printer 500 will proceed to deposit successive layers onto the substrate until part 508 is formed. It will be appreciated that the angled portions of part 508 may include the stair-stepped effect as previously described.

In an exemplary embodiment, after the part 508 is printed using the 3-D print extruder 502 (FIG. 5), then at 680, the 3-D printer 500 may spray form the surface of part 508, including the stair-stepped portions, to finish the part and thereby smoothen the angled portions of part 508. In this exemplary embodiment, the part 508 printed using conventional means constitutes an intermediate structure that is finished using the spray form portion of 3-D printer 500. In another exemplary embodiment and depending on the instructions provided to 3-D printer 500, the robotic arm 514 may contemporaneously provide finishing on portions of intermediate structure 508 while the print extruder 502 is depositing layers of material. In another exemplary embodiment, based on a different set of instructions, 3-D printer 500 may 3-D print the structure 508 in part using print extruder 502 and in part using spray forming via robotic arm 514 and nozzle 516.

While for purposes of clarity the robotic arm 514 is shown to be small in scale relative to build plate 504 and the part 508, in other embodiments robotic arm 514 may be constructed in any flexible manner. For example, robotic arm 514 may be longer, have a wider range, and have a more flexible geometry to enable it to spray form the part 508 from all angles, or a wide range of angles including an inverted angle relative to the floor.

Figure 7:
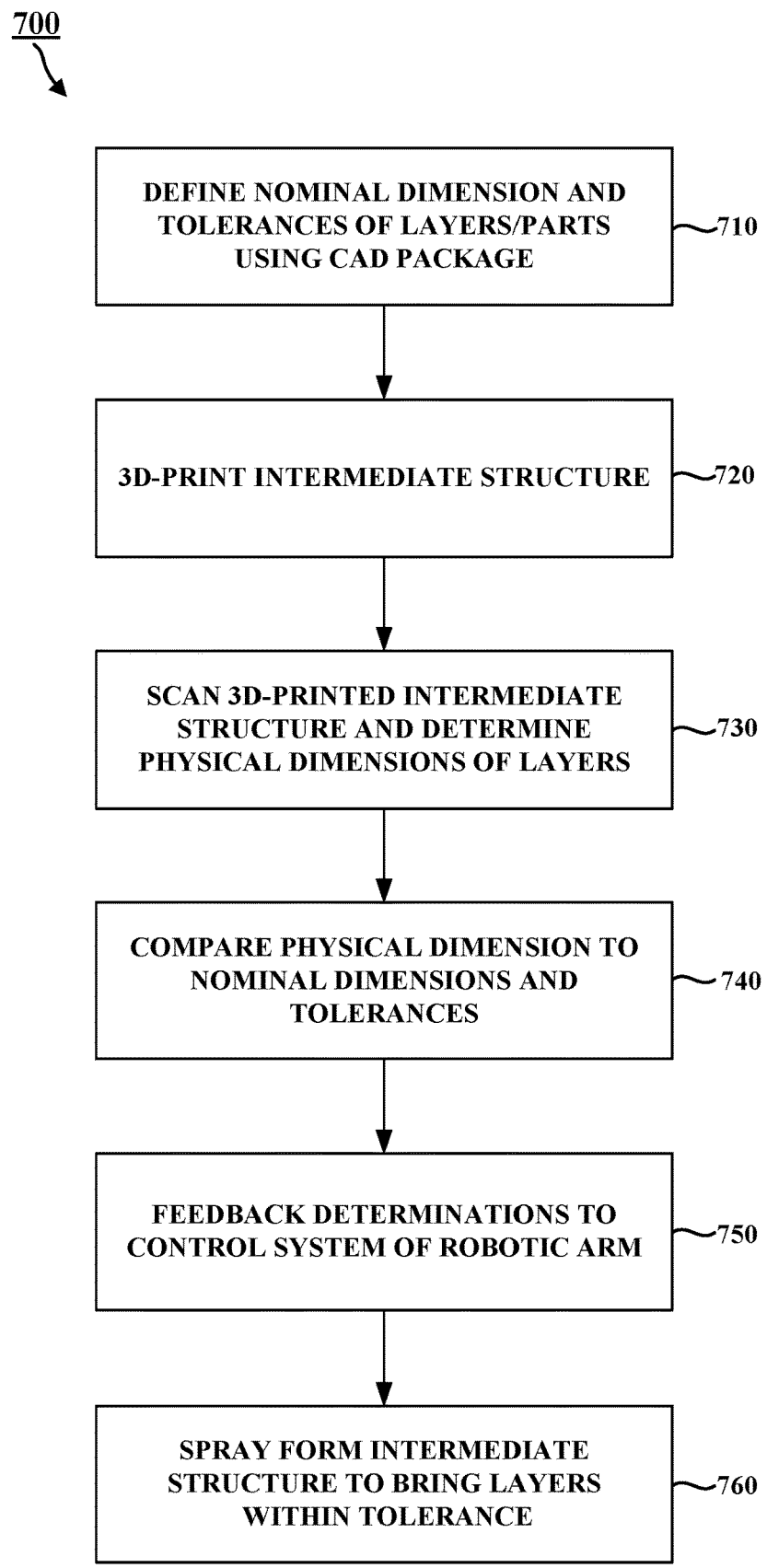
FIG. 7 is a flow diagram illustrating an exemplary method for 3-D printing using in situ monitoring of stair-stepped effects of the 3-D printed structure.
Figure 8A:
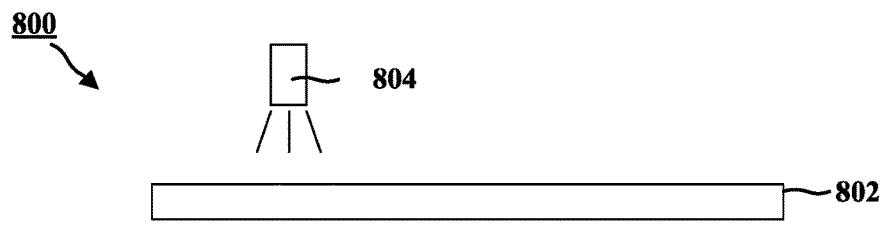
FIGS. 8A-8E are diagrams illustrating example of a use of a plastic additive manufacturing pattern for coldspray additive manufacturing.
Figure 8B:
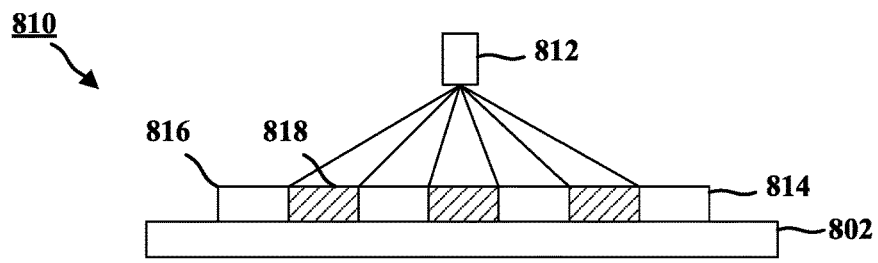
Figure 8C:
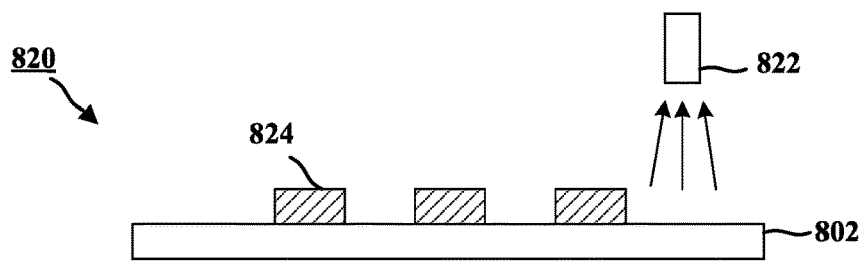
Figure 8D:
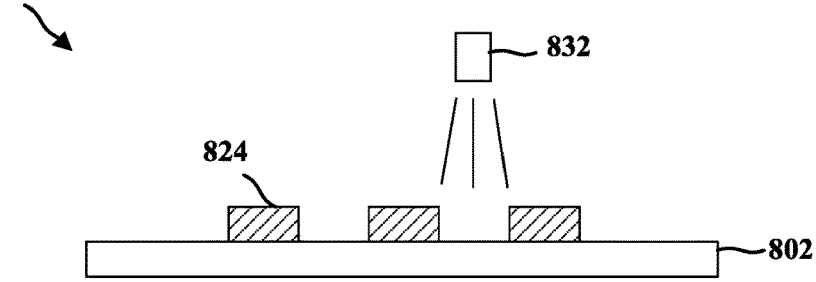
Figure 8E:
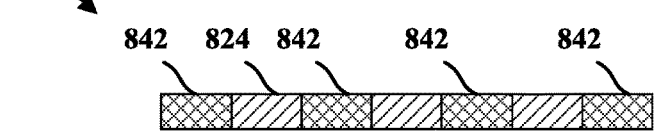

In another exemplary embodiment shown in the flowchart 700 of FIG. 7, the 3-D printer employs in situ monitoring of stair-stepped effects or other variations of a 3-D printed structure. During programming using the CAD models or another suitable software technique, nominal dimensions and tolerances of one or more layers constituting the structure may be defined (step 710). For example, a nominal dimension of a layer thickness (at an edge or otherwise) may be defined along with a corresponding tolerance of deviation from the nominal dimension. As an illustration, if a nominal thickness for a particular layer is one inch, a corresponding tolerance may be +/−0.005 inches, or any suitable number. Other dimensions may be similarly defined. For example, a specified nominal dimension of an angle or contour of an inclined surface of the structure may be defined along with a corresponding tolerance for the angle or contour.

The 3-D printer prints an intermediate structure (step 720). The 3-D printer may scan the printed intermediate structure and thereby determine the actual physical dimension at issue, such as the thickness of the layers, the measurement of stair-stepped effects in an angled portion, etc. (step 730). In one exemplary embodiment, the scanning is performed after the 3-D printed intermediate structure is rendered. In another exemplary embodiment, the scanning is performed in real time while the intermediate structure is being printed. Having received the actual physical dimension(s) at issue, the 3-D printer and/or its control system or associated software application may compare the determined physical dimension(s) to the nominal dimension(s) and the respective tolerance(s) (step 740).

The 3-D printer may then provide feedback to the control system of the robotic arm, such as, for example, when the determined physical dimensions fall outside the tolerance of the identified nominal dimensions (step 750). Using this feedback, the 3-D printer may spray form the intermediate structure to provide material to bring the affected layers and/or structures within the specified tolerances (step 760). Thus, for example, the spray former may smooth out rough edges and/or add thickness to portions of the structure. Depending on the embodiment, the spray forming may be performed in real time during the 3-D printing of the intermediate structure (using an FDM, SLS or another technique). Alternatively, the spray forming may be performed after the intermediate structure is complete.

FIGS. 8A-8D are diagrams 800, 810, 820, 830, 840 illustrating example of a use of a plastic additive manufacturing pattern for coldspray additive manufacturing. Coldspray additive manufacturing is a process of additively manufacturing by spraying one or more materials to form a manufactured article. With the coldspray manufacturing process, a material being deposited may be kept below the material's melting point. The material being deposited may be sprayed at a base material at a speed high enough to induce solid state welding on impact. The material may be sprayed using a nozzle, e.g., a cold spray nozzle. The position and orientation of the nozzle may be controlled, e.g., relative to plate on which the manufactured article may be formed. Accordingly, the nozzle may build up the manufactured article over time by spraying material layer by layer to form the manufactured article. Material may be sprayed onto other cold sprayed material to form the device being manufactured. Materials used may include one or more of metal, metal alloy, or other materials used for solid state weld processes. Different areas of a coldspray manufactured item may be made from different coldspray materials. For example, multiple metals, multiple alloys, or multiple other materials may be used. In an aspect, plastic additive manufacturing of a pattern in conjunction with coldspray additive manufacturing processes may allow for higher resolution, cheaper part costs, and/or faster additive manufacturing, for example.

A plastic pattern may be quickly created. For example, a complex pattern may be additively created in plastic. For example, referring to diagram 800, a build plate 802 may be used as a surface to build on. An uncured plastic material may be deposited onto the build plate 802 using a depositor 804. Accordingly, referring to diagram 810, uncured plastic material 814 may be deposited. A ultraviolet (UV) light 812 may be used to selectively cure portions 818 of the uncured plastic material 814 and leave other portions 816 uncured. In an aspect, plastic may be used so that the coldspray material does not bond to selective regions. For example, the material may be chosen to ensure that it does not react with the coldspray material.

The diagram 820 illustrates that the remaining uncured plastic material 814 in the portions 816 may be vacuumed up. As illustrated in the diagram 820, the portions 816 have been removed. The portions 816 may be removed to leave cured plastic material 824 that may form a pattern for subsequent manufacture of a part of parts. In other aspects, the remaining uncured plastic material 814 in the portions 816 may be swept away, e.g., using one or more brushes; blown away, e.g., using puffs of compressed air; suctioned away, e.g., using a suction device; or otherwise removed.

As illustrated in diagram 830, a cold spray gun 832 may be used to deposit material, e.g., metal, metal alloy, or other material onto the build plate, e.g., around the plastic material 824. The cold spray gun 832 may be used to build up multiple layers of metal, metal alloy, or other material onto the build plate. For example, as illustrated in the diagram 840, the metal, metal alloy, or other material may be built up to form the part 842.

In an aspect, the plastic pattern may be altered such that the surface of the plastic is conductive. Conductivity may be achieved in one or more of multiple methods. For example, plastic printing of a conductive plastic may be used. In another example, a conductive layer may be painted onto the plastic pattern to add a conductive layer. Once the desired patterned area is conductive, electroplating methods are employed to lay down a sufficient layer of metal. In an aspect, material, e.g., metal, used for electroplating, may be selected to match a hardness value of the material used for the coldspray, e.g., metal. Other appropriate material property considerations may be selected as well.

It is also possible to use higher resolution metal additive manufacturing to achieve a surface suitable for cold-spray deposition. A shell which of the desired pattern is printed which may be cheaper, faster, and easier to print due to the not requiring printing the entire part using a slow additive method.

On top of the pattern, a coldspray gun then deposits an even layer on top of the pattern. This builds up a larger part.

In the case of a plastic pattern, the plastic can be removed from the metal through chemical reactions or elevated temperatures. If it retains its original shape, can be reused as a pattern for another coldspray deposition.

Figure 9A:
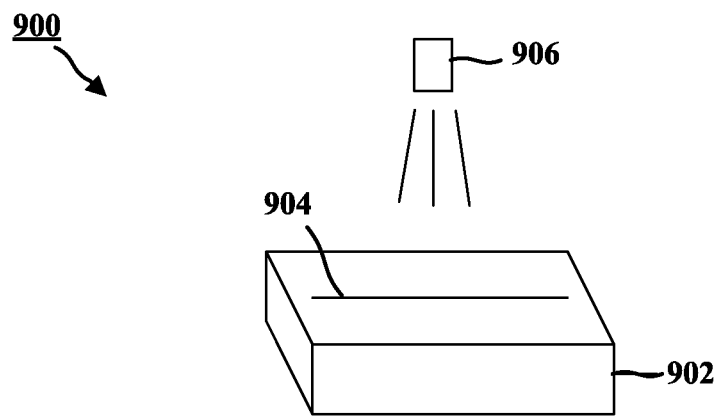
FIGS. 9A-9B are diagrams illustrating example for increasing fatigue limit and strength of selectively laser melted components.
Figure 9B:
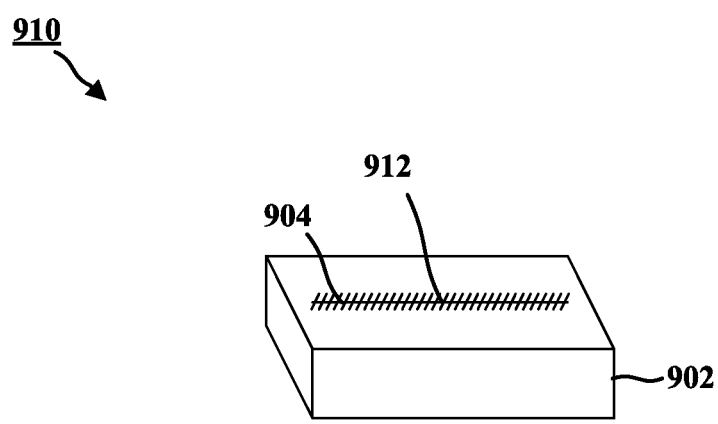

FIGS. 9A-9B are diagrams 900, 910 illustrating example for increasing fatigue limit and strength of selectively laser melted components. A fatigue limit may be defined as a highest stress a material can withstand for a certain number of cycles without breaking and/or failing. Generally, a material may withstand a higher stress a lower number of cycles than a lower stress. Accordingly, a material may have multiple fatigue limits, e.g., a first stress level, x cycles, a second stress level, y cycles, and/or a third stress level, z cycles, for example. Furthermore, stresses at different stress levels may be cumulative with stress levels at other stress levels, e.g., a failure may occur at x/2 cycles at the first stress level plus y/2 cycles at the second stress level, for example. In an aspect, a component 902 may have a flaw 904. The systems and methods described herein may increasing fatigue limit and strength of the component 902 by depositing material using a cold spray gun 906. The cold spray gun 906 may deposit material in a cold spray such as metal, metal alloy, or other material such as plastics, ceramics and mixtures thereof.

The diagram 910 illustrates a flaw 904 may be repaired 912, increasing fatigue limit and strength using the cold spray gun 906. For example, the cold spray may increase the fatigue limit and strength of selectively laser melted component 902. Selectively laser melted components may suffer from increased surface roughness on unsupported, downward facing surfaces. The artefacts resulting from support structural removal may also serve as stress concentration and crack initiation points. These surfaces, when left untreated, may be sites for crack propagation. Cracking may limit the fatigue life of a part, such as the component 902, significantly. Selectively laser melted components also often suffer from increased porosity at layers where the build has been paused mid-build. Increased porosity may lead to a defect. The defect of increased porosity may affect an entire build. Increased porosity may also reduce the fatigue limit. For example, increased porosity may limit fatigue limit because of an ease of crack initiation at a weaker layer where the porosity exists. As described herein, systems and methods may selectively increase the fatigue limit of selectively laser melted parts, e.g., using cold spray material.

In an aspect, coldspray may utilize materials that may have higher bulk fatigue limits as compared to weldable materials that might be used for crack repair. Materials that may have higher bulk fatigue limits may include, but are not limited to Aluminum 7075. Additionally, cold spray may increase the compressive stresses on the surface, where cracks may initiate. In an aspect, coldspray may selectively strengthen selectively laser melted parts. The areas to selectively apply a coldspray coating may be computationally selected, optically selected (as in the case of pauses mid-build causing a discontinuously rough surface).

In an aspect, the systems and methods described herein may use the systems and methods described herein to process parts with small tolerances by undersizing the selectively laser melted components to account for the additional coldspray coating.

Figure 10:
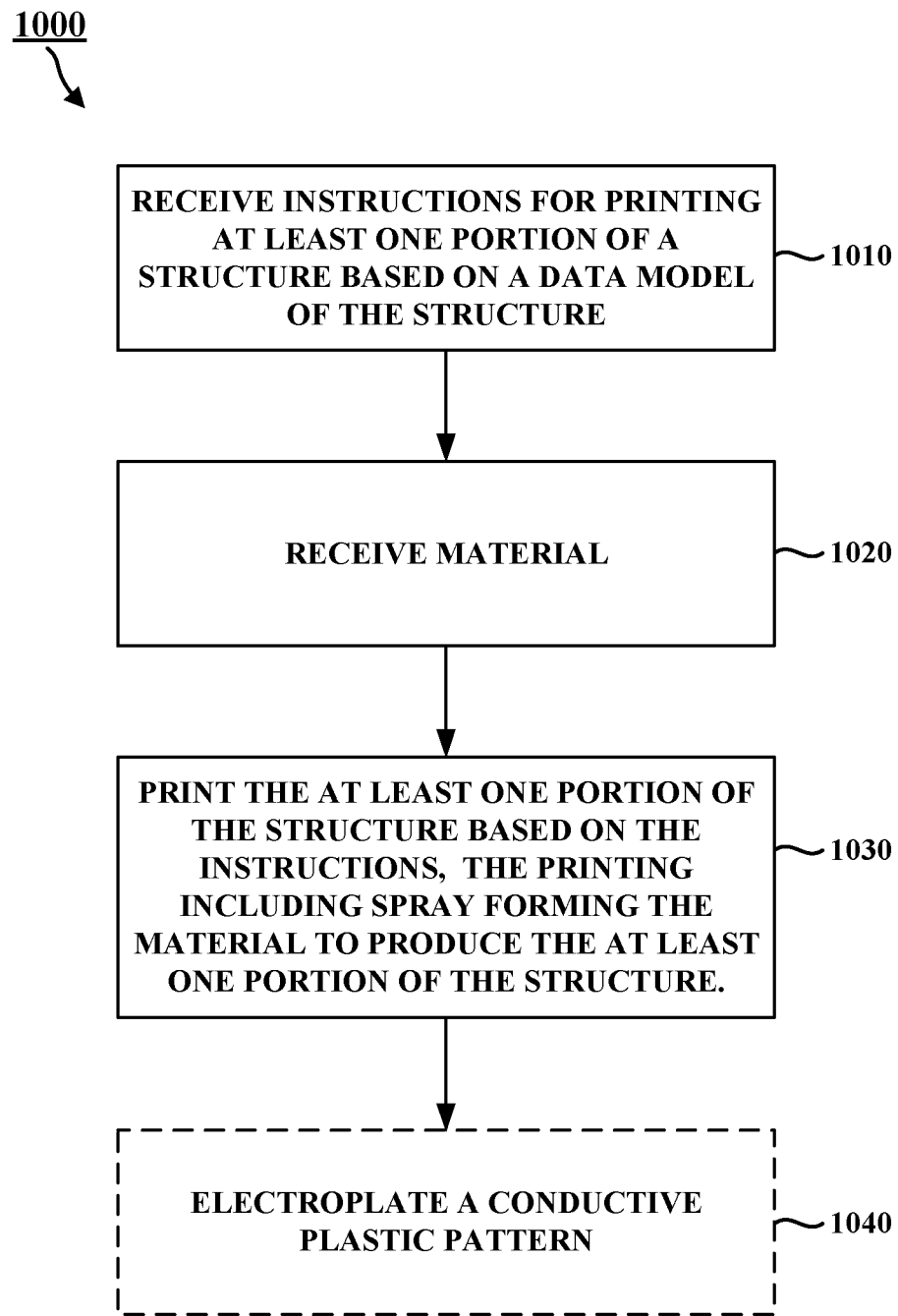
FIG. 10 is a flow diagram illustrating an exemplary method in accordance with the systems and methods described herein.

FIG. 10 is a flow diagram 1000 illustrating an exemplary method in accordance with the systems and methods described herein. At 1010, a device implementing the method may receive instructions for printing at least one portion of the structure. The instructions may be based on a data model of the structure. For example, a device 100, 400, 500 implementing the method may receive instructions for printing at least one portion of the structure such as the part 842, the component 902, or the repair 912 to the component 902. The instructions may be based on a data model of the structure (part 842, component 902, or repair 912). In an aspect, the instructions may include an instruction causing a determination of a location for strengthening of a subcomponent of the structure using the at least one portion of the structure.

At 1020, a device implementing the method may receive material. For example, a device 100, 400, 500 implementing the method may receive material, e.g., such as plastic, metal, metal alloy, or other material.

At 1020, a device implementing the method may print the at least one portion of the structure based on the instructions. The printing may include spray forming the material to produce the at least one portion of the structure. For example, a device 100, 400, 500 implementing the method may print the at least one portion of the structure such as the part 842, the component 902, or the repair 912 to the component 902. The printing may be based on the instructions. The printing may include spray forming the material such as by spraying droplets 412 such as from a nozzle on a robotic arm 414. The spray forming may produce the at least one portion of the structure such as the part 842, the component 902, or the repair 912 to the component 902. In an aspect, the material may include a material having a high bulk fatigue limit relative to a second material of the subcomponent of the structure.

In an aspect, spray forming the material to produce the at least one portion of the structure further may include using a pattern. The pattern comprises an additively manufactured plastic pattern. The pattern may be configured to increases the resolution of the spray forming.

In an aspect, the printing comprises printing the at least one portion of the structure at the location for strengthening, based on the instructions, the printing comprising spray forming the material to on the subcomponent of the structure to produce the structure.

At 1040, optionally, a device implementing the method may electroplate the conductive plastic pattern. For example, device 100, 400, 500 implementing the method may electroplate the conductive plastic pattern, e.g., made from the plastic material 824. Accordingly, the plastic pattern may include a conductive plastic pattern. The conductivity achieved using at least one of using conductive plastic or painting a conductive layer on the plastic pattern. Thus, the conductive plastic may be electroplated the conductive plastic pattern.

In an aspect, the subcomponent may include a PBF part.

In an aspect, the spray used for spray forming increases compressive stresses on the surface. The spray may be directed where cracks are likely to initiate.

In an aspect, the location for strengthening is a location that is computationally selected. In another aspect, the location for strengthening is a location that is optically selected.

The previous description is provided to enable any person skilled in the art to practice the various aspects described herein. Various modifications to these exemplary embodiments presented throughout this disclosure will be readily apparent to those skilled in the art, and the concepts disclosed herein may be applied to 3-D printing techniques using spray forming. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A method of forming a structure, comprising:
   receiving instructions for printing at least one portion of the structure, the instructions based on a data model of the structure;
   determining a location for strengthening a subcomponent of the structure using the at least one portion of the structure;
   receiving material; and
   printing the at least one portion of the structure at the location for strengthening based on the instructions, the printing comprising spray forming the material to produce the at least one portion of the structure onto the subcomponent of the structure.

2. The method of claim 1, wherein the material comprises a first material having a high bulk fatigue limit relative to a second material of the subcomponent of the structure.

3. The method of claim 2, wherein the subcomponent comprises a laser melted part.

4. The method of claim 1, wherein the spray forming increases compressive stresses on an external surface of the structure where cracks are likely to initiate.

5. The method of claim 1, wherein the location for strengthening is a location that is computationally selected.

6. The method of claim 1, wherein the location for strengthening is a location that is optically selected.

7. An apparatus for forming a structure, the structure including a first portion, a second portion, and a structural joint, the apparatus comprising:
   a memory; and
   at least one processor coupled to the memory and configured to:
   receive instructions for printing at least one portion of the structure, the instructions based on a data model of the structure;
   determine a location for strengthening a subcomponent of the structure using the at least one portion of the structure;
   receive material; and
   print the at least one portion of the structure at the location for strengthening based on the instructions, the printing comprising spray forming the material to produce the at least one portion of the structure onto the subcomponent of the structure.

8. The apparatus of claim 7, wherein the material comprises a first material having a high bulk fatigue limit relative to a second material of the subcomponent of the structure.

9. The apparatus of claim 8, wherein the subcomponent comprises a laser melted part.

10. The apparatus of claim 7, wherein the spray forming increases compressive stresses on an external surface of the structure where cracks are likely to initiate.

11. The apparatus of claim 7, wherein the location for strengthening is a location that is computationally selected.

12. The apparatus of claim 7, wherein the location for strengthening is a location that is optically selected.

13. A method of forming a structure, comprising:
    receiving instructions for printing at least one portion of the structure, the instructions based on a data model of the structure;
    receiving material; and
    printing the at least one portion of the structure based on the instructions, the printing comprising spray forming the material to produce the at least one portion of the structure using a pattern, wherein the pattern is configured to increase the resolution of the spray forming.

14. The method of claim 13, wherein the pattern comprises an additively manufactured plastic pattern.

15. The method of claim 14, wherein the plastic pattern comprises a conductive plastic pattern, and wherein the conductivity is achieved using at least one of conductive plastic or painting a conductive layer on the plastic pattern.

16. The method of claim 15, further comprising electroplating the conductive plastic pattern.

17. An apparatus for forming a structure, the structure including a first portion, a second portion, and a structural joint, the apparatus comprising:
    a memory; and
    at least one processor coupled to the memory and configured to:
    receive instructions for printing at least one portion of the structure, the instructions based on a data model of the structure;
    receive material; and
    print the at least one portion of the structure based on the instructions, the printing comprising spray forming the material to produce the at least one portion of the structure using a pattern, wherein the pattern is configured to increase the resolution of the spray forming.

18. The apparatus of claim 17, wherein the pattern comprises an additively manufactured plastic pattern.

19. The apparatus of claim 18, wherein the plastic pattern comprises a conductive plastic pattern, and wherein the conductivity is achieved using at least one of conductive plastic or painting a conductive layer on the plastic pattern.

20. The apparatus of claim 19, wherein the at least one processor is further configured to electroplate the conductive plastic pattern.

* * * * *